United States Patent

[11] 3,609,141

| [72] | Inventors | Hiroshi Fujisawa<br>2-1, Karikuchidai Tarumi-ku, Kobe, Hogo;<br>Keiichi Sugimoto, 2-2, Tsukumodai, Suita, Osaka; Katsuo Aoki, 3-1-6; Minamikoshien Nishinmiga, Hyogo; Tai Matsuzawa, 5-18, Tsukumodia, Suita, Osaka; Seizo Kawaziri, 441 Kawazono-cho, Suita, Osaka; Hiroyuki Mima, 64 Kizuyama-cho, Hyogo; Nobuyuki Kitamori, 5-18, Tsukumodai, Suita, Osaka, all of Japan |
|---|---|---|
| [21] | Appl. No. | 799,607 |
| [22] | Filed | Feb. 17, 1969 |
| [45] | Patented | Sept. 28, 1971 |
| [32] | Priority | Feb. 19, 1968, Feb. 7, 1969 |
| [33] | | Japan |
| [31] | | 43/10454 and 44/9600 |

[54] MAGNESIUM SLAT OF 5-METHYL-3-(2,6-DICHLOROPHENYL)-4-ISOXAZOLYL-PENICILLIN
1 Claim, 1 Drawing Fig.

[52] U.S. Cl. .................................................. 260/239.1, 424/271
[51] Int. Cl. .................................................. C07d 99/16
[50] Field of Search ........................................ 260/239.1

[56] References Cited
UNITED STATES PATENTS
2,996,501   8/1961   Doyle et al.................   260/239.1

*Primary Examiner*—Nicholas S. Rizzo
*Attorney*—Wenderoth, Lind & Ponack

ABSTRACT: Magnesium salt of 5-methyl-3-(2,6-dichlorophenyl)-4-isoxazolyl-penicillin demonstrates antimicrobial activity.

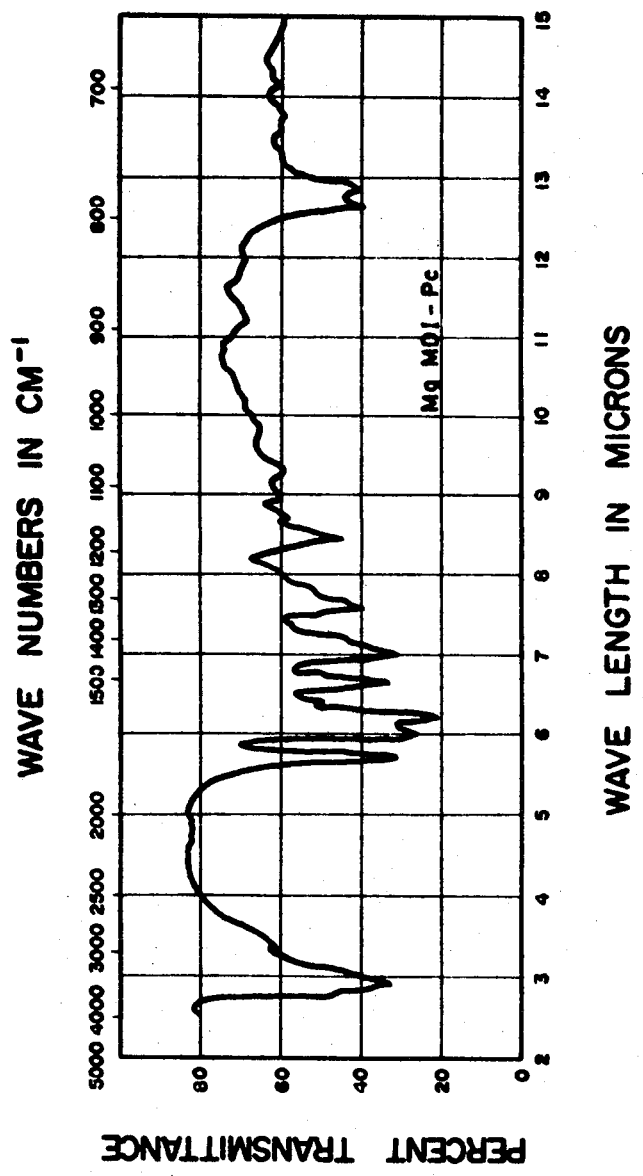

MAGNESIUM SALT OF 5-METHYL-3-(2,6-DICHLOROPHENYL)-4-ISOXAZOLYL-PENICILLIN

This invention is concerned with a novel and useful magnesium salt of penicillin and with the preparation thereof.

More specifically, the invention relates to a magnesium salt of 5-methyl-3-(2,6-dichlorophenyl)-4isoxazolyl-penicillin (hereinafter abbreviated as MCl-PC), which causes no local reactions by injection and shows a high and prolonged blood level.

Hitherto, there have been known various kinds of MDI-PC salts, such as sodium-, potassium-, aluminium-, calcium-, ammonium- and substituted amine salts, but these salts of MDI-PC are inevitably accompanied by some fatal defects in their medical use, which are as mentioned below:

1. The ammonium salt and substituted amine salts (e.g., trialkylamino-, N,N'-dibenzylethylenediamine-, dibenzylamine-, carbocaine salt, etc.) of MCl-PC are all oily substances quite unstable against humidity, which makes it substantially impossible to prepare a solution or emulsion thereof.

Furthermore, these salts cause, upon intramuscular injection, a rather strong local reaction at the site of injection.

Thus, these salts have not been put into practical use.

2. The sodium salt, potassium salt and aluminum salt of MDI-PC possess the defect from the viewpoint of clinical use that they cause extraordinarily strong local reaction at the site of injection, i.e., there occurs a heavy necrosis at the site of injection, and, thus, the host unavoidably suffers from very severe pain when injected with these salts.

Furthermore, all these salts are rather unstable to humidity and therefore, the antimicrobial potency of these salts in a form of solution or suspension are remarkably reduced after a storage for even a short period of time.

3. The calcium salt of MDI-PC does not cause so strong local reaction, but it shows only a poor blood level and cannot maintain a prolonged effect.

Moreover, the salt remains as a precipitate in muscle for a relatively long period of time after its intramuscular administration.

Extensive studies in search of an MDI-PC preparation free from the foregoing disadvantages have led to the finding that the magnesium salt of MDI-PC shows an antibacterial activity equal to or higher than the known MDI-PC salts, causes no local reaction at all at the site of injection, shows a high and prolonged blood level and furthermore shows a high storage stability, particularly, against humidity.

Therefore, the present magnesium salt of MDI-PC is more advantageously used as an antimicrobial medicine in the same field as in the known penicillin salts.

The object of the present invention is, thus, to provide a novel and useful magnesium salt of MDI-PC.

Another object of the present invention is to provide a method for the production of the novel magnesium salt of MDI-PC, and further object of this invention is to provide novel penicillin preparations.

Other objects and advantages of this invention will further become apparent hereinafter.

The present magnesium salt of MDI-PC has the following pharmacological and other properties.

Toxicity

Magnesium salt of MDI-PC is administered to male mice (ICR-JCL/T strain) weighing 20 to 22 grams and male rat (SD JCL/T strain) weighing 130 to 160 grams and $LD_{50}$ is calculated. The result is as follows:

TABLE 1

| Route | $LD_{50}$, mg./kg. (95%-C.L.) | |
|---|---|---|
| | Mice | Rat |
| i.p. | 1,650 (1,577–1,734) | 1,350 (1,138–1,600) |
| i.m. | 3,800 (3,207–4,503) | >5,000 |
| p.o. | 15,000 | >10,000 |

Antibacterial Activity

The antibacterial spectrum of Mg-MDI-PC and Na-MDI-PC measured on trypticase soy agar is as follows:

TABLE 2

| Test microorganisms | Minimum Inhibitory concentration (mcg./ml.) | |
|---|---|---|
| | Na-MDI-PC | Mg-MDI-PC |
| *Staphylococcus aureus* 209 P | 0.195 | 0.195 |
| *Staphylococcus aureus* Heatly | 0.195 | 0.195 |
| *Staphylococcus aureus* 308A-1 | 0.195 | 0.195 |
| *Staphylococcus pyogenes* Dick | 0.1 | 0.1 |
| *Staphylococcus viridans* s.p. | 1.56 | 0.78 |
| *Diplococcus pneumoniae*: | | |
| Type I | 0.195 | 0.195 |
| Type II | 0.1 | 0.195 |
| Type III | 0.1 | 0.195 |
| *Bacillus subtilis* PCI-219 | 0.195 | 0.195 |
| *Shigella flexneri* EW-10 | >100 | >100 |
| *Escherichia coli* Umezawa | >100 | >100 |

Therapeutic effect

The test result of therapeutic effect in mice infected with the following micro-organisms is described below as a value of $ED_{50}$.

TABLE 3
($ED_{50}$, mg./kg.)

| | *Staphylococcus aureus* 308A-1 | |
|---|---|---|
| Route | Na-MDI-PC | Mg-MDI-PC |
| s.c. | 23 | 28.2 |
| p.o. | 200 | 154 |

TABLE 4
($ED_{50}$, mg./kg.)

| | *Streptococcus pyogenes* E-14 | |
|---|---|---|
| Route | Na-MDI-PC | Mg-MDI-PC |
| s.c. | 6.9 | 4.46 |
| p.o. | 32.5 | 50 |

TABLE 5
($ED_{50}$, mg./kg.)

| | *Diplococcus pneumoniae* Type I | |
|---|---|---|
| Route | Na-MDI-PC | Mg-MDI-PC |
| s.c. | 493 | 223 |
| p.o. | 400 | 132 |

From the foregoing data, it is clearly understood that the magnesium salt of MDI-PC shows an antibacterial activity equal to or higher than that of sodium salt of MDI-PC which is the most widely used known penicillin salt.

Stability

1. Powdery Mg-MDI-PC and Na-MDI-PC are stored at 40° C. under 75 percent of relative humidity for 4 weeks, at the end of which time antibacterial activity of each sample is measured by an iodometry method.

The result is as follows:

TABLE 6

| | After 4 weeks storage at 40° C., 75% relative humidity | |
|---|---|---|
| Sample | Appearance | Antibacterial activity (percent relative to that of the sample before the storage) |
| Mg-MDI-PC | Unchanged | 98% |
| Na-MDI-PC | Deliquesced, and colored yellow | 5% or less |

2. Crystalline MG-MD-PC (average particle size of about 7 microns) is suspended in water to produce a 10 percent aqueous suspension. The suspension is stored under such conditions as described below, at the end of which time antibacterial activity of the suspension is measured by an iodometry method.

Result is as follows:

TABLE 7

| | Antibacterial activity (percent relative to that of the suspension before the storage) |
|---|---|
| Storage conditions at — | |
| 40° C. for 2 weeks | 100 |
| 40° C. for 4 weeks | 96 |

From the foregoing results, (table 6 and 7), it is seen that Mg-MDI-PC is much more stable than Na-MDI-PC, and that the Mg-MDI-PC is kept stable even in the state of an aqueous suspension.

Blood level

One-hundred mg. of a 10 percent aqueous suspension of MDI-PC salt (variable) is intramuscularly administered to a rabbit and a blood level change with time is measured.

The result is as follows:

TABLE 8

| MDI-PC salt | Blood level (μg./ml.) change with time | | | | | | |
|---|---|---|---|---|---|---|---|
| | 1 hr. | 2 hrs. | 3 hrs. | 4 hrs. | 6 hrs. | 8 hrs. | 10 hrs. |
| K-salt [1] | 8.0 | 7.3 | 7.8 | 5.6 | 4.4 | 4.1 | 2.9 |
| Ca-salt [2] | 7.9 | 6.3 | 5.7 | 4.7 | 3.2 | 2.3 | 2.1 |
| Al-salt [2] | 11.1 | 9.3 | 8.3 | 7.1 | 4.6 | 3.3 | 2.7 |
| Na-salt [1] | 12.5 | 10.2 | 8.6 | 8.1 | 6.3 | 5.6 | 5.0 |
| Mg-salt [2] | 16.3 | 17.1 | 14.3 | 12.6 | 11.3 | 9.0 | 5.6 |

[1] 10% solution is administered.
[1] 10% suspension is administered.

From the result, it is seen that the present Mg-MDI-PC shows a higher blood level for a more prolonged time in comparison with K-salt, Ca-salt, Al-salt and Na-salt.

Local reaction

One milliliter of a 10 percent aqueous suspension or solution of MDI-PC salt (variable) is intramuscularly administered to a rabbit.

After 24 hours from the administration, the muscular area to which the salt is administered is subjected to an autopsy.

The autopsy findings are described below.

TABLE 9

| MDI-PC-salt | Autopsy findings in the muscle. |
|---|---|
| Mg-MDI-PC [1] | No appreciable change is found. |
| Ca-MDI-PC [1] | Bleeding and drug deposition are observed. |
| Na-MDI-PC [2] | Necrosis, bleeding are observed and the muscle becomes brownish. |
| K-MDI-PC [2] | Necrosis and bleeding are observed and the muscle becomes brownish. |
| Al-MDI-PC [1] | Necrosis and bleeding are observed and the muscle becomes brown or white. |

[1] 10% suspension is administered.
[2] 10% solution is administered.

From the table 9, it is seen that Mg-MDI-PC causes no local reaction, while other salts cause violent local reactions.

The present magnesium salt of MDI-PC is prepared by allowing a solution of a magnesium ion donor to contact with a solution of free MDI-PC or a MDI-PC salt of a metal exchangeable with magnesium.

The MDI-PC salt of a metal exchangeable with magnesium may be exemplified by salts of MDI-PC with a metal which shows a stronger ionization tendency than magnesium, such metal being mentioned by sodium, potassium, calcium, lithium, barium, etc. Among them, sodium and potassium salts are desirable.

The magnesium ion donor may be any of magnesium salts of inorganic acid such as magnesium sulfate, magnesium chloride, magnesium carbonate, magnesium hydroxide, magnesium nitrate, etc. and magnesium salts of organic acid such as magnesium succinate, magnesium acetate, etc. Among the magnesium ion donors, magnesium sulfate and magnesium chloride are most practically used.

As regards the solvent for the MDI-PC or its salt, water and other chloride are most practically used.

As regards the solvent for the MDI-PC or its salt, water and other hydrophilic organic solvents such as acetone, methanol, ethanol, etc., may be used. These solvents may also be used in suitable combinations. And, in case of MDI-PC, methanol, ethanol and acetone are advantageously used, while in case of MDI-PC salt of a metal, water is practically used.

Concentration of MDI-PC or its salt in the solution is optional, but from a practical point of view, the use of a saturated solution of MDI-PC or its salt is most desirable.

As to the solvent for magnesium ion donor, there is used the solvents described above, and water is most advantageously used.

An amount of the magnesium ion donor in the solution is generally adjusted to about 0.1 normal to a saturated concentration.

The reaction is preferably effected at a temperature from about 10° to about 30° C.

In the present method, a solution of the magnesium ion donor mat be added to the solution of the MDI-PC or its metal salt, or conversely the latter solution may be added to the former one, or further the two solutions may simultaneously be allowed to contact with each other. And, among these procedures, the most desirable one is that comprising adding a solution of the MDI-PC or its metal salt, especially an aqueous solution thereof, to a solution of the magnesium ion donor, especially an aqueous solution thereof, under stirring, since this procedure can unexpectedly give the desired magnesium salt of MDI-PC in a fine crystalline state of an average particle size of about 1 to about 2 microns.

The magnesium salt of MDI-PC produced according to this invention is a white powder to fine particle which is soluble in methanol, ethanol and acetone, hardly soluble in water, chloroform and isopropanol, and insoluble in ether, n-hexane and benzene. The infrared spectrum of this product is shown in the FIGURE of drawing.

The present magnesium salt of MDI-PC can be administered safely per se or in the form of a pharmaceutical composition in admixture with a suitable and conventional carrier or an adjuvant, administered orally or by way of injection, without giving harm to the host.

The pharmaceutical composition can take the form of tablet, granule, powder, syrup, suspension, solution, etc., for oral administration, or injection for subcutaneous or intramuscular administration.

Usual daily dose of the present compound lies in the range of about 500 to 6,000 milligrams, more practically about 700 to 1,500 milligrams per human adult.

The choice of preparations is determined by the preferred form of administration and standard pharmaceutical practice. But, the present magnesium salt of MDI-PC is particularly advantageously administered to a host by means of intramuscular or subcutaneous injection in the form of a suspension or solution.

With regard to the injectable preparation of present magnesium salt of MDI-PC, a further explanation is given in the following.

The injectable preparation practically used is that comprising the magnesium salt of MDI-PC as the active ingredient, water, a magnesium cation donor, a buffer agent, an isotonic agent and a suspending agent.

The injectable preparation may be manufactured, for example, by suspending the magnesium salt of MDI-PC in water, followed by the addition of magnesium cation donor and buffer agent in an optional order, together with, if desired, an isotonic agent, a suspending agent, a stabilizer, a surface active agent, antiseptic agent, and the like.

For manufacturing the pharmaceutical preparations, magnesium salt of MDI-PC of fine powdery state (e.g., that of average particle size of 1 to 2 microns) is preferably put into use.

As the magnesium cation donor, there may be employed, for example, an inorganic salt of magnesium (e.g., magnesium chloride, magnesium sulfate, magnesium carbonate, etc.,) and an organic salt of magnesium (e.g., magnesium succinate, etc.). An amount of the magnesium cation donor generally ranges from 0.1 to 6 percent relative to the whole amount of the preparation.

As the buffer agent, there may be employed, for example, magnesium succinate, magnesium phthalate, etc., so that the pH value of the injectable preparation can be kept at 5.5 to 6.5, or desirably at around 6 with the aid of a small amount of hydrochloric acid, etc. An amount of the buffer agent to be employed in about 0.5 to about 1.5 percent relative to the whole amount of the preparation.

As the isotonic agent, there may be used magnesium chloride and inactive sugars such as inositol, sorbitol, glucose, fructose, etc. An amount of the isotonic agent is from about 2 to about 10 percent relative to the whole amount of the preparation.

As the suspending agent, there may be employed, for example, methyl cellulose, carboxymethyl cellulose, polyvinyl pyrrolidone, hydroxymonopropyl cellulose, etc. The amount of the suspending agent is from about 0.001 to about 0.5 percent preferably 0.1 to 0.5 percent relative to the whole amount of the preparation.

In the injectable preparations, there may be employed, if necessary, a surface active agent such as fatty acid esters of sorbitan, fatty acid esters of polyoxyethylene sorbitan, polyoxyethylene ether of hydrogenated castor oil, etc., an antiseptic agent such as methyl p-oxybenzoic acid and propyl p-oxybenzoic acid, etc.

The following are typical examples of the suitable injectable preparations.

(1)

| | |
|---|---|
| Mg-MDI-PC* | 10% |
| $MgCl_2 \cdot 6H_2O$ | 1% |
| Mg. succinate $4H_2O$ | 0.8% |
| Methyl p-oxybenzoic acid | 0.1% |
| Propyl p-oxybenzoic acid | 0.01% |
| Inositol 5% | |
| Methyl cellulose | 0.1% |
| Polyoxyethylene sorbitan mono-oleate | 0.03% |

*average particle size is 1 to 2 microns.

Distilled water is added to the above so as to make the whole amount 100 percent, and the pH value of the preparation is adjusted to 6.0 by the addition of HCl.

(2)

| | |
|---|---|
| Mg-MDI-PC* | 10% |
| $MgCl_2 \cdot 6H_2O$ | 2% |
| Mg. succinate $4H_2O$ | 1% |
| Methyl cellulose | 0.1% |
| Bensalkonium chloride | 0.01% |

*average particle size is 1 to 2 microns.

Distilled water is added to the above so as to make the whole amount 100 percent, and the pH value of the preparation is adjusted to 6.0 by the addition of HCl.

Example 1

In 200 parts by volume of water is dissolved 10.2 parts by weight of sodium salt of MDI-PC. To the solution is dropwise added, with vigorous stirring, a solution of 2.23 parts by weight of magnesium chloride ($MgCl_2 \cdot 6H_2O$) in 20 parts by volume of water.

The resulting precipitate is collected by filtration, washed with 20 parts by volume of water and then dried at 40° C. under reduced pressure to yield 9.5 parts by weight of magnesium salt of MDI-PC melting at 1175° C. with decomposition.

The magnesium salt has an average particle size of about 30 to about 50 microns or larger. Yield 95.0 percent, purity 98.0 percent (measured by a cup-plate bioassay method).

Example 2

In 500 parts by volume of water is dissolved 50 parts by weight of sodium salt of MDI-PC. To the solution is dropwise added, with vigorous stirring, a solution of 11.5 parts by weight of magnesium acetate ($Mg(AC)_2 \cdot 4H_2O$) in 100 parts by volume of water, whereby white crystals precipitate out. When precipitation is complete, the whole resulting mixture is cooled and, then, the precipitate is collected by filtration.

After washing with 100 parts by volume of water, the precipitate is dried at 40° C. under reduced pressure to yield 45.0 parts by weight of crystalline magnesium salt of MDI-PC. The magnesium salt has an average particle size of about 30 to about 50 microns or larger. Yield 91.9 percent, purity 98.0 percent (measured by a cup-plate bioassay method).

Example 3

To a solution of 9.4 parts by weight of MDI-PC in 50 parts by volume of methanol is added 0.7 part by weight of magnesium hydroxide, and the mixture is stirred at room temperature for 30 minutes. After the insolubles are discarded, 100 parts by volume of water is added to the reaction mixture to obtain a white precipitate. The system is cooled, and then, the precipitate is collected by filtration. After washing with 20 parts by volume of 30 percent methanol, the precipitate is dried at 40° C. under reduced pressure to yield 9.6 parts by weight of crystalline magnesium salt of MDI-PC. The magnesium salt is an average particle size of about 30 to about 50 microns or larger. Yield 96.0 percent, purity 97.0 percent (measured by a cup-plate bioassay method).

Example 4

To a solution of 18.8 parts by weight of MDI-PC in 100 parts by volume of acetone is added 2.0 parts by weight of magnesium carbonate, and the resulting mixture is stirred at room temperature. After the evolution of carbon dioxide gas has ceased, the reaction mixture is filtered. To the filtrate is added dropwise 400 parts by volume of water, whereby white crystals precipitate out. When the precipitation is complete, the whole resulting mixture is cooled. The resulting precipitate is collected by filtration and washed with 50 parts by volume of 20 percent acetone, followed by drying at 40° C. under reduced pressure. This procedure gives 180 parts by weight of crystalline magnesium salt of MDI-PC. The magnesium salt has an average particle size of about 30 to about 50 microns or larger. Yield 90.0 percent purity 98.0 percent (measured by a cup-plate bioassay method).

Example 5

In 3,500 parts by volume of water is dissolved 500 parts by weight of sodium salt of MDI-PC, followed by subjecting to sterile-filtration. On the other hand, in 5,000 parts by volume of water is dissolved 300 parts by weight of magnesium sulfate ($MgSO_4 \cdot 7H_2O$), followed by subjecting to sterile filtration. The former sodium solution is added dropwise to the latter magnesium sulfate solution under agitation, whereby white crystals precipitate out. When the precipitation is complete, the whole resulting mixture is subjected to centrifugal filtration to collect the precipitate. The precipitate is thoroughly washed with water and dried under reduced pressure, whereupon 450 parts by weight of crystalline magnesium salt of MDI-PC is obtained. The crystals have an average particle size of 1 to 2 microns. Yield: 90 percent, purity 99 percent (measured by a cup-plate bioassay method).

Example 6

In 3,500 parts by volume of water is dissolved 500 parts by weight of potassium salt of MDI-PC, followed by subjecting to sterile-filtration. On the other hand, in 5,000 parts by volume of water is dissolved 200 parts by weight of magnesium chloride ($MgCl_2 \cdot 6H_2O$), followed by subjecting to sterile-filtration. The former potassium solution is added droplets to the latter magnesium chloride solution under agitation, whereby white crystals precipitate out. When the precipitation is complete, the whole resulting mixture is subjected to centrifugal filtration to collect the precipitate. The precipitate is thoroughly washed with water and dried under reduced pressure, whereupon 450 parts by weight of crystalline magnesium salt of MDI-PC is obtained. The crystals have an average particle size of 1 to 2 microns. Yield: 91 percent purity: 98 percent (measured by a cup-plate bioassay method).

What is claimed:
1. Magnesium salt of 5-methyl-3-(2,6-dichlorophenyl)-4isoxazolyl-penicillin.

UNITED STATES PATENT OFFICE
CERTIFICATE OF CORRECTION

Patent No. 3,609,141　　　　　　　Dated September 28, 1971

Inventor(s) HIROSHI FUJISAWA ET AL.

It is certified that error appears in the above-identified patent and that said Letters Patent are hereby corrected as shown below:

In the heading of the patent, page 1, immediately following "Patented September 28, 1971" insert --Assignee - Takeda Chemical Industries, Ltd., Higashi-ku, Osaka, Japan--.

Column 1, line 8, change "MCI-PC" to --MDI-PC--;
line 18, change "MCI-PC" to --MDI-PC--.

Column 2, line 69, change "MG-MD-PC" to --Mg-MDI-PC--.

Column 4, line 21, change "mat" to --may--.

Signed and sealed this 8th day of August 1972.

(SEAL)
Attest:

EDWARD M. FLETCHER, JR.　　　ROBERT GOTTSCHALK
Attesting Officer　　　　　　　Commissioner of Patents